Jan. 1, 1935.  W. B. PARKER  1,986,407

KNAPSACK SPRAYER

Filed June 24, 1932

INVENTOR.
William B. Parker.
BY
White, Prost, Flehr & Lothrop
ATTORNEYS.

Patented Jan. 1, 1935

1,986,407

UNITED STATES PATENT OFFICE 1,986,407

KNAPSACK SPRAYER

William B. Parker, Placerville, Calif., assignor to California Spray-Chemical Corporation, Berkeley, Calif., a corporation of Delaware Application June 24, 1932, Serial No. 619,107

6 Claims. (Cl. 299—86)

The invention, in general, relates to apparatus for applying insecticidal or fungicidal materials in liquid form to pest-infested or diseased growth. More particularly, the invention relates to apparatus which is adapted to apply materials of the aforementioned character simultaneously to a plurality of plants, trees and the like in an area thereof.

The present device has been devised for practicing the method disclosed in my copending application, Serial No. 635,861, filed October 1, 1932, and entitled "Method of controlling plant pests and plant diseases".

An object of the invention is to provide a device which is adapted to apply concentrated liquid insecticidal or fungicidal materials to infested or diseased growth in effective killing or destroying amounts without injury to the foliage thereof and without waste of material.

A further object of the invention is to provide a device of the aforementioned character which conveniently can be carried on the person and readily manipulated by hand.

Other objects of the invention, together with some of the advantageous features thereof, will appear from the following description of the preferred embodiment of the invention.

The device of my invention, in its preferred form, comprises a tank for carrying liquid insecticidal or fungicidal materials and adapted to be retained on the person, and a plate also adapted to be retained on the person, together with a spray nozzle, means for forcing the material from the tank through the nozzle to produce a spray thereof, and means for causing a stream of air to move at a relatively high velocity and under a relatively low pressure through and from a spout encompassing said nozzle, all supported on said plate, whereby the spray is enveloped and the liquid material is atomized by, diffused in and carried by the air in the form of a floating, plant-enveloping, fog-like mist containing miscroscopic particles of the liquid material.

Figure 1:
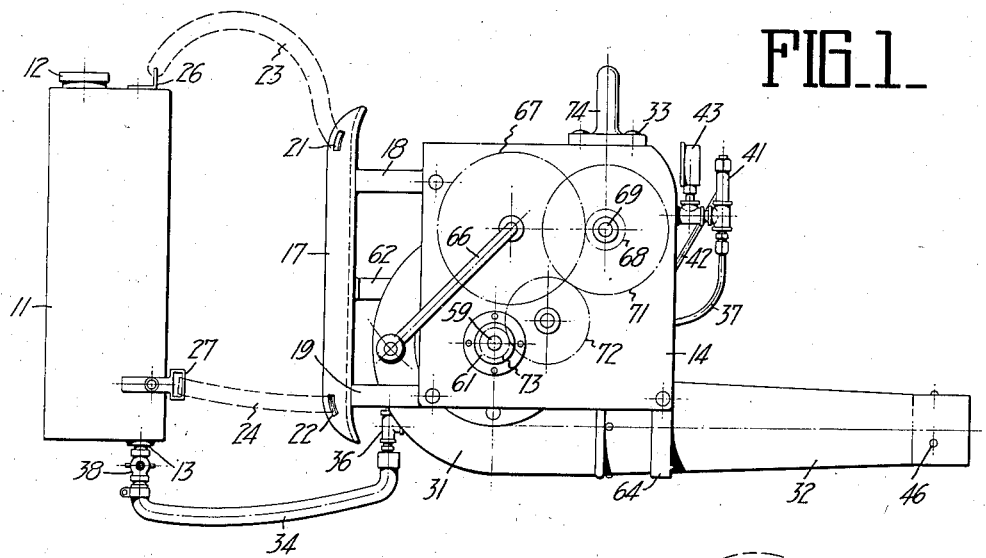
Figure 1 is a diagrammatic side elevation of an embodiment of my invention.
Figure 2:
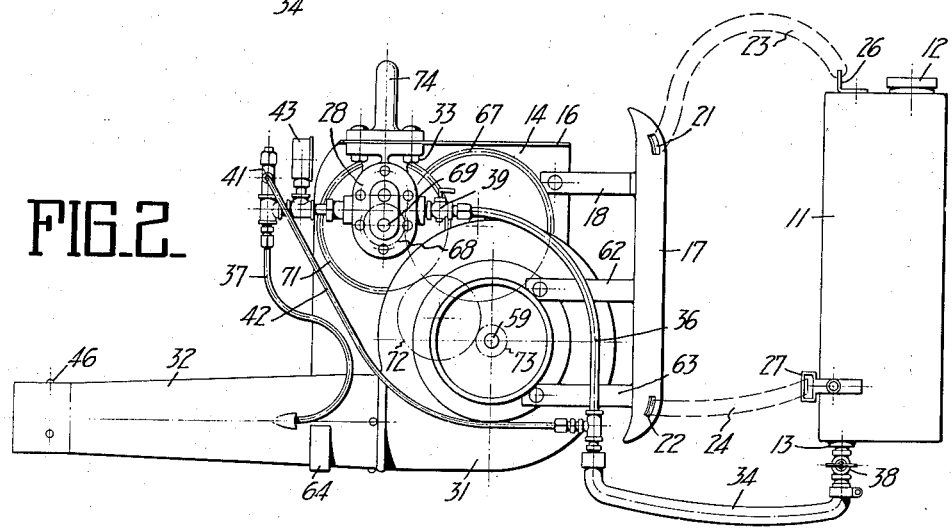
Figure 2 is a diagrammatic elevation of the embodiment of my invention which is shown in Figure 1, but viewed from the side opposite to that which is illustrated in Figure 1.
Figure 3:
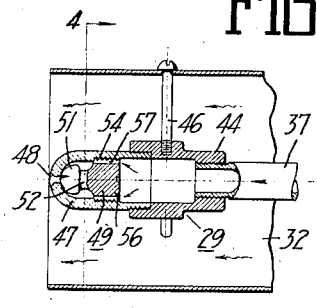
Figure 3 is an enlarged cross-sectional view of a portion of the device.
Figure 4:
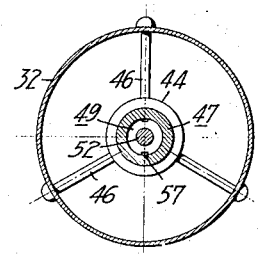
Figure 4 is a view taken on the line 4—4 of Figure 3.

As illustrated in Figures 1 and 2 of the drawing, I provide a tank 11 for holding a convenient quantity of liquid insecticidal or fungicidal material. The tank preferably is fabricated of a relatively light and inexpensive metal, such as tin, and formed to such a size and shape as, together with its contents, conveniently and comfortably can be retained upon the back of a person of average proportions. A suitable screw cap 12 serves to close the inlet of the tank, and a pipe connection 13 is fitted to the outlet thereof. The various operable elements of the device preferably are mounted in compact relationship upon a plate 14 having a lateral extending flange 16 thereon. The plate 14, together with the several elements supported thereon, conveniently can be carried upon the breast of the operator of the device and, as a suitable means for bracing the plate against the body, I provide a breast plate 17 which is secured, by means of strips 18 and 19, to the plate. The breast plate is slotted, as at 21 and 22, in order that shoulder straps 23 and a waist belt 24, as indicated by the dotted lines in Figures 1 and 2, can be looped therethrough. The straps 23 and belt 24 pass through slotted brackets 26 and 27 respectively which are carried upon the tank 11.

The several elements for producing a spray of the liquid material and for enveloping the spray in a rapidly moving stream of air under low pressure to transform the spray into a floating plant-enveloping, fog-like mist containing microscopic particles of the liquid material include a pump 28, either of the rotor, piston or other positive displacement type, a spray nozzle 29, suitable connections between the tank 11, pump 28 and nozzle 29 for conducting the liquid material, a blower 31, a spout 32 communicating with the outlet of the blower and encompassing and supporting the nozzle 29, and means for driving the pump and the blower.

In the preferred embodiment of the invention which I have illustrated in the drawing, the pump 28 is mounted, by any suitable means, such as screw bolts 33, upon the flange 16 of the plate 14. A flexible connection, such as a rubber hose 34, establishes communication between the pipe connection 13 leading from the outlet of the tank 11 and a pipe connection 36 leading to the inlet of the pump 28. A connection 37 leads from the outlet of the pump to the nozzle 29. I have provided a petcock 38 in the pipe connection 13 for regulating the flow of material from the tank 11 and have interposed a manually operable valve 39 in the pipe connection 36 for controlling the flow of material through the pump. An adjustable needle valve 41 is provided in the pipe connection 37 in order to regulate the flow of material to the nozzle 29, and a by-pass connection 42 spans the pipe connections 36 and 37 to allow return of material to the inlet side of the pump. Preferably, the material is forced through the spray nozzle 29 under a pressure of approximately 30 to 40 pounds per square inch, and, if desired, a pressure gauge 43 can be interposed in the connection 37. The connection 37 conveniently is connected to the nozzle 29 by means of a hollow coupling 44 and means, such as screws 46, serve to secure the coupling 44 and the nozzle 29 to the spout 32. The nozzle 29 preferably is supported so that the tip thereof is disposed flush with the outlet of the spout.

Figure 5:
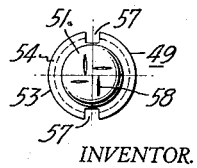
Figure 5 is an enlarged plan of one element of the portion of the device which is illustrated in Figure 3.

The type of spray nozzle which I preferably employ in the device is of the character used in the machine of my invention which is described in my copending application, Serial No. 619,108, filed June 24, 1932, and entitled "Machine for applying materials to plants, trees and the like". The nozzle includes an internally and externally threaded cap 47 having a relatively small orifice 48 in the tip thereof and a plug 49 which is adjustably mounted with respect to the cap. The plug 49 comprises a head 51, substantially semi-spherical in contour, a neck 52, and a body 53, the latter being threaded, as at 54, for engagement with the internal threading of the cap 47. A slot 56 is cut in the free end of the body for receiving a tool whereby the plug can be moved toward and away from the tip of the nozzle. To provide channels for the liquid material, the body 53 is grooved longitudinally thereof and preferably through the threads 54, as at 57, and the head 51 is provided with a series of grooves 58, as illustrated in Figure 5 of the drawing. The arrangement of the grooves 58 is such that the material is sprayed in the form of a whirling cone and thereby is more or less uniformly distributed in the air stream passing through the spout 32.

In order to secure the blower 31 rigidly to the plate 14, I have journaled the fan shaft 59 of the blower in a bearing 61 which is firmly attached to the plate and have provided strips 62 and 63 connecting the housing of the blower to the breast plate 17 which, as above related, is secured to the plate 14. A hook clamp 64, attached to the plate 14 and engaging the spout 32 aids in retaining the spout in position.

In accordance with the invention, a hand crank 66 and suitable gearing are provided for driving the pump 28 and blower 31. As illustrated in Figure 1, the crank is journaled in the plate 14 and carries a gear 67 which meshes with a pinion 68 on an extended shaft 69 of one rotor of the pump. The shaft 69 also carries a gear 71 which meshes with an idler gear 72, journaled in the plate 14, which in turn meshes with a gear 73 carried on the fan shaft 59 of the blower. Rotation of the crank 66, thus, results in simultaneous operation of the pump 28 and blower 31 whereby the liquid material is forced through the nozzle 29 and issues in the form of a spray and a stream of air, moving at a relatively high velocity and under low pressure discharges from the spout 32, envelops the spray and atomizes and diffuses the material therein so that microscopic particles of the material are carried in the created air blast in the form of a floating, fog-like mist. A hand grip 74 is mounted upon the flange 16 of the plate 14, and conveniently by utilizing the screw bolts 33 which secure the pump 28 thereto, in order that the device can be braced against the body during movement of the crank 66.

I have successfully employed the above described device in the treatment of infested and diseased growth. The percentage of kill of pests was relatively high and the fungi were destroyed without injury to the plant life. A relatively small amount of material was used per acre of plants treated and the work was done in a practical length of time. My success was due to the fact that the fog-like mist liberated by the device possessed the properties set forth in my first above mentioned copending application; namely, the mist persisted for an appreciable period of time, floated freely through and enveloped the growth over which it was directed and contained particles of the liquid material ranging in size from approximately .100 to .300 millimeters in diameter whereby thin, even films of the material were deposited upon all portions, including both sides of the foliage, of the plants. Practical tests for determining whether the liberated fog-like mist is of the proper character are by observation thereof and by inspection of the treated growth. If the fog-like mist is greyish-white in appearance, envelops the growth and persists for an appreciable period of time, and, further, if thin, even films of the material are found on the various portions and both sides of the foliage, the mist liberated is of the proper and effective character. On the other hand, if the mist vanishes rapidly into the atmosphere and there is little or no deposit of the material upon the growth or, again, if the mist falls rapidly to the ground and plants nearest to the device are drenched while those farther from the spout receive no deposit of material, the amount of material introduced and distributed in the stream of air, in the first instance, is too small, and, in the second instance, is too great. A simple adjustment of the plug 49 with respect to the cap 47 of the nozzle can be made for correcting the character of the mist.

While I have illustrated the preferred embodiment of the invention in the drawing, it is to be understood that I am not to be limited to the embodiment shown, as my invention, as defined in the appended claims, can be embodied in a plurality and variety of forms.

I claim:

1. A knapsack device for applying liquid materials to plants, trees and the like to control plant pests and plant diseases, said device comprising a tank for holding the material to be applied, a plate, a breast plate on said plate, means connecting said breast plate and said tank for supporting said plate and said tank in balanced relation on the person with the breast plate resting upon the breast of the person, a blower on said plate, a spout on said plate communicating with the outlet of said blower, a pump on said plate communicating with said tank and geared to said blower, a nozzle on said plate communicating with the outlet of said pump and supported within said spout, a crank journaled in said plate and geared to said blower, and a handle for actuating said crank; actuation of said crank causing a spray of said material to be ejected from said nozzle and to be diffused in a stream of air of relatively high velocity and under relatively low pressure which is caused to pass from said blower through said spout thereby liberating a floating, plant-enveloping, fog-like mist of air and microscopic particles of said material from said spout.

2. A knapsack device for applying liquid materials to plants and the like to control plant pests and plant diseases, said device comprising a tank for holding a liquid insecticidal or fungicidal material and adapted to be retained on the back of the person, a plate, a breast plate on said plate, means connecting said breast plate and said tank for supporting the plate upon the breast of the person, a blower supported on said plate, a spout in communication with said blower, a nozzle in said spout, a pump supported on said plate and communicating with said tank and with said nozzle, a crank journaled in said plate and geared to said pump, and gears connecting said pump and said blower whereby, upon rotation of said crank, a stream of air is caused to move through and from said spout at a relatively high velocity and under a relatively low pressure and particles of liquid material are ejected from said nozzle, introduced into and distributed in said stream of air and atomized thereby and diffused therein so as to produce a floating, plant-enveloping fog-like mist consisting of air and microscopic particles of the liquid insecticidal or fungicidal material.

3. A knapsack device for applying liquid materials to plants and the like to control plant pests and plant diseases, said device comprising a tank for holding liquid insecticidal or fungicidal material and adapted to be retained on the person, a plate for retention on the person, a breast plate on said plate, straps connecting said breast plate and said tank for supporting said tank and said plate on the person, said tank and said breast plate being maintained on opposite sides of said person and in balanced relation and means on said plate for producing a spray of said material and for causing a stream of air to move at a relatively high velocity and under a relatively low pressure and to envelop said spray and diffuse the same in the stream of air; said means including a spray nozzle, a crank journaled in said plate, a pump geared to the crank and communicating with said tank and said nozzle, a spout encompassing and supporting said nozzle, and a blower on said plate and geared to said pump; said blower communicating with said spout.

4. In a knapsack device for use in controlling plant pests or plant diseases, a tank for holding liquid insecticidal or fungicidal materials and adapted to be retained on the person, a plate for retention on the person, means connecting said tank and said plate for supporting them in balanced relation on the person, a pump, a blower and a crank, all journaled in said plate, gears connecting said crank and said pump, gears connecting said pump and said blower whereby, upon rotation of said crank, said pump and said blower are operated, a spray nozzle communicating with the outlet of said pump and a spout encompassing and supporting said nozzle and communicating with the outlet of said blower.

5. In a knapsack device of the character described, a breast plate, a hand operated air blast liquid sprayer secured to the breast plate and extending from the forward side thereof, a storage tank for liquid spray material spaced rearwardly from the breast plate, means for connecting the tank with said breast plate whereby the device tends to balance upon an operator, and means forming a liquid connection between said tank and said sprayer.

6. In a knapsack device of the character described, a breast plate, a hand operated air blast liquid sprayer secured to the breast plate and extending from the forward side thereof, said sprayer including a liquid pump cooperating with an air blower, a storage tank for liquid spray material spaced rearwardly from the breast plate, means connecting the tank with said breast plate whereby the device tends to balance upon an operator, and means forming a liquid connection between said tank and the inflow side of said pump.

WILLIAM B. PARKER.